Patented Sept. 21, 1926.

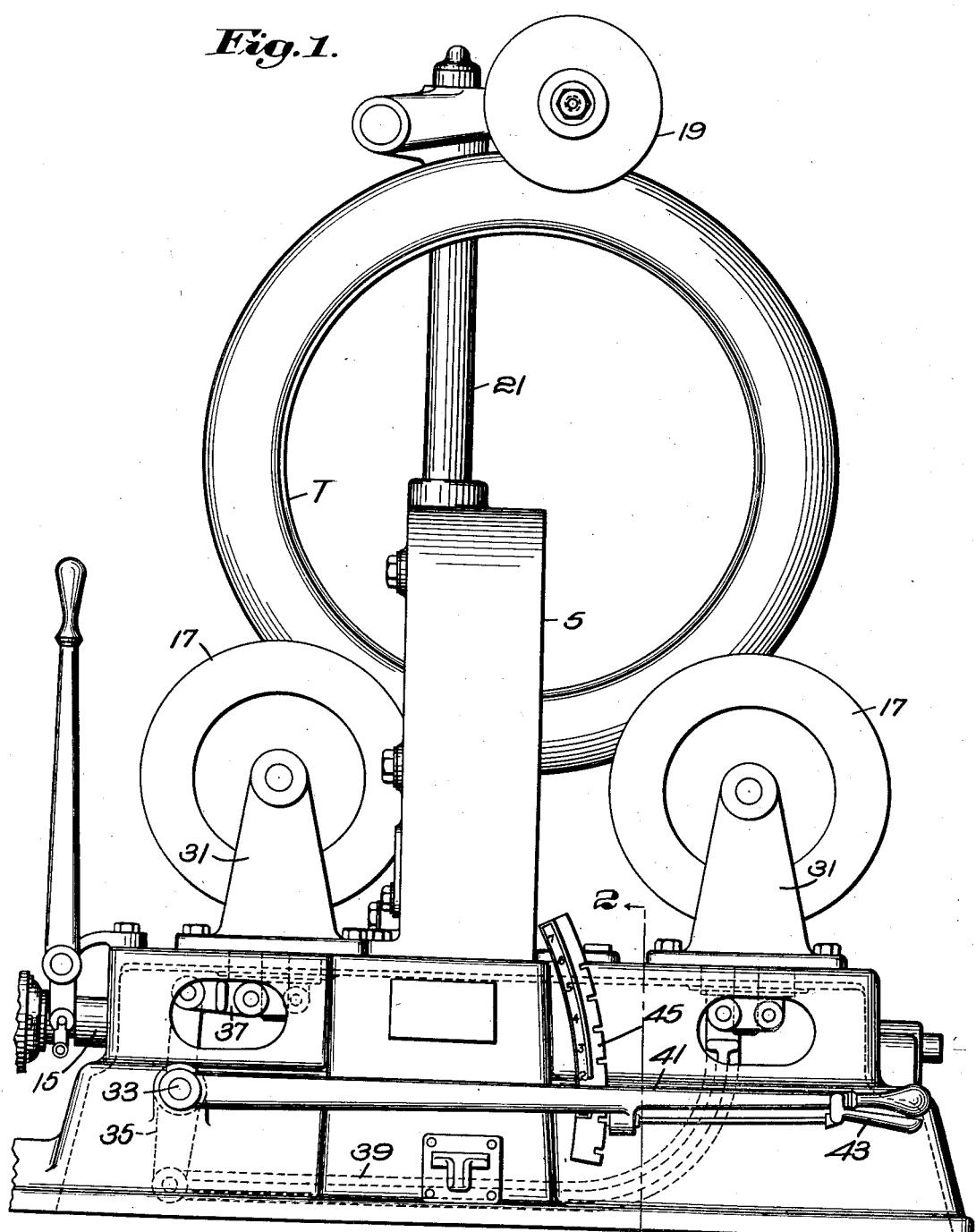

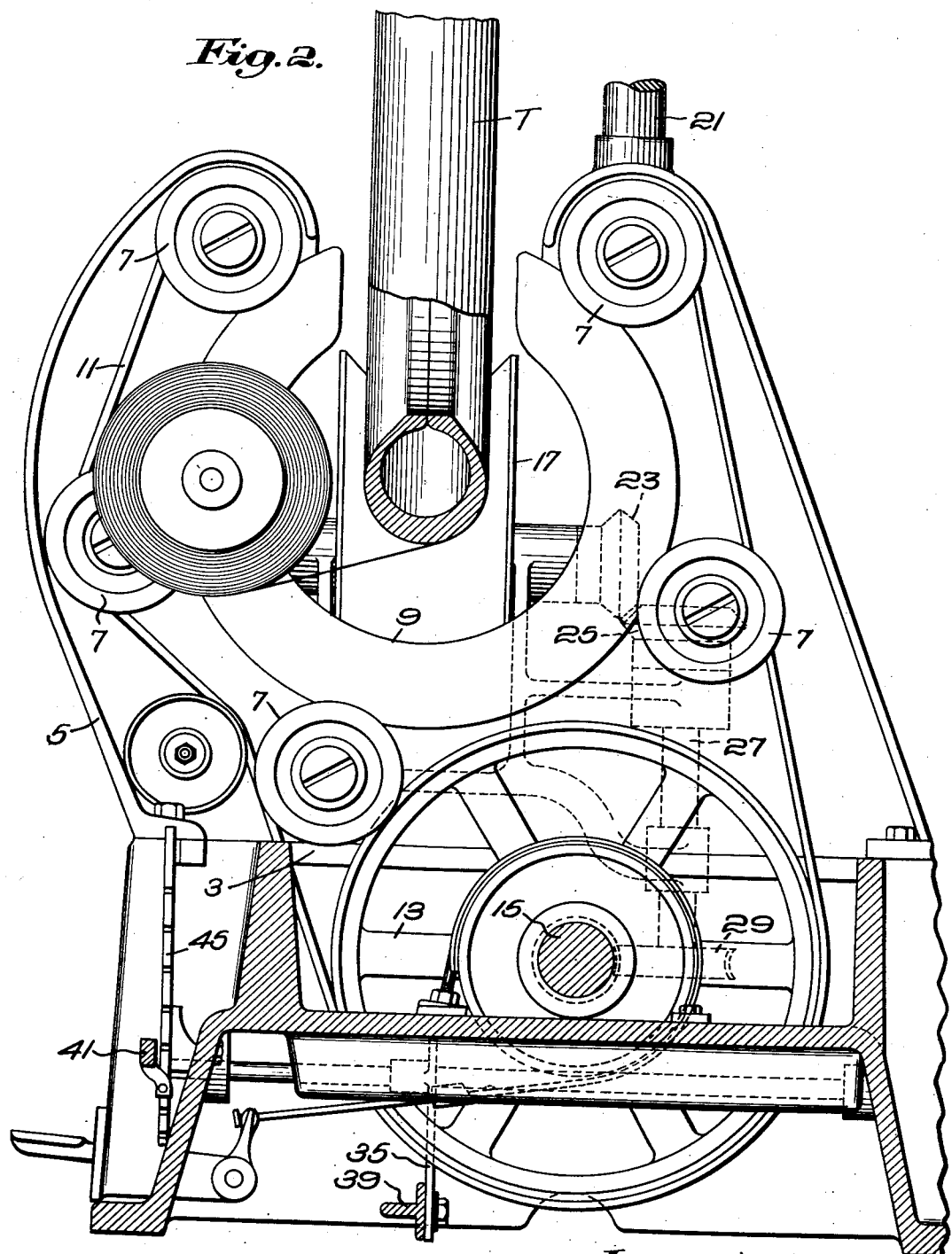

1,600,498

UNITED STATES PATENT OFFICE.

WILLIAM M. WHEILDON, OF ASHLAND, MASSACHUSETTS, ASSIGNOR, BY MESNE ASSIGNMENTS, TO PIERCE WRAPPING MACHINE COMPANY, OF CHICAGO, ILLINOIS, A CORPORATION OF ILLINOIS.

WRAPPING MACHINE.

Application filed March 12, 1920. Serial No. 365,336.

This invention relates to machines for wrapping articles, and more particularly annular articles, with a helically applied strip. Such machines are commonly used for wrapping tires. The invention more particularly has to do with the mechanism for supporting and moving the article to be wrapped.

While my invention may be embodied in various mechanical forms the principles of the same may be well understood by reference to the following description of one particular form shown by way of example in the accompanying drawings, wherein:

Fig. 1 is a side elevation of the machine with parts broken away; and

Fig. 2 is a transverse section on line 2—2 of Fig. 1 and is on an enlarged scale.

The machine shown in the drawings has a frame comprising an elevated bed 3 beneath which may be housed certain mechanisms hereinafter to be referred to, from which bed rises a standard 5 (see Fig. 2) in the form of an incomplete annulus gapped at the top and on which may be mounted supporting rolls 7. The rolls receive and rotatably support the partly annular shuttle 9 which carries the roll of wrapping material. To rotate the shuttle it may be received in a loop of a driving belt 11 trained around the terminal rolls 7 and the drive wheel 13 carried by the drive shaft 15 which is received beneath the bed 3. The annular article T, usually a tire, is preferably, as shown in Fig. 1, supported in vertical position with the lower portion thereof traversing the eye of the shuttle and for this purpose it may be sustained from beneath by two supporting rolls 17 against which it is held by a roll 19 bearing on the upper portion of the tire. Conveniently this roll 19 is pivoted, as shown, to a post 21 rising from the standard 5 and thus its weight is effective to hold the tire in position and firmly press it against the rolls 17, one or both of which may be driven to revolve the tire to provide a proper pitch for the wrapping as is common in machines of this type. Referring to Fig. 2, I have there shown in dotted lines a bevel gear 23 on the shaft of a roll 17 meshing with a bevel gear 25 on a vertical shaft 27 which carries a worm wheel 29 taking motion from a worm (not shown) on the main drive shaft 15. The driving connection by worm and worm wheel permits shifting of the rolls in a manner hereinafter described.

It has been found to be important to center the tire in the wrapping shuttle 9 and for this purpose and to accommodate tires of different diameters the rolls 17 are arranged to move transversely of the plane of the shuttle so that the distance between them may vary and they may be made to engage different tires at the extremities of different arcs. It will be understood that as the arc of the circumference of the tire between the rolls 17 varies, the vertical position of the lowermost point of the tire will also vary and thus by adjusting the two rolls 17 toward and from the plane of the shuttle in Fig. 1 the position of the tire may be varied so that in traversing the shuttle it may be central to the latter.

In the present embodiment of the invention the rolls 17 are journalled in suitable carriages 31 which slide to and from the shuttle in slots in the bed 3. In accordance with my invention means are provided whereby when one of the rolls is moved a simultaneous correlative adjusting movement of the other roll is determined or, as herein, effected and preferably this movement is equal in amount and opposite in direction so that in all adjusted positions of the two rolls 17 the vertical diameter of an annular article supported thereby always lies in the same vertical line, conveniently at the point of application of the wrap by the rotating shuttle. In accordance with my invention I provide for the connection of the two rolls by a linkage which will insure equal and opposite movements thereof and which is of simple and cheap construction. Herein I have provided a rock shaft 33 extending transversely beneath the bed 3 of the machine and on the rock shaft 33 may be mounted a lever 35 providing crank arms extending in opposite directions from the shaft. A link 37 connects one of these crank arms to the carriage 31 of the left hand roll in Fig. 1 and another link 39 connects the other end to the carriage of the right hand roll 17. Preferably the arms of the lever 35 are equal and it will be understood that on a counterclockwise movement of the shaft 33 for example, the left hand roll 17 will be moved to the left away from the plane of the shuttle and the right hand roll will be moved to the right an equal distance but also away from the plane of the shuttle.

To effect adjusting movement of the rolls the linkage may be operated by rocking shaft 33 and herein the shaft projects to the outside of the machine frame where it is provided with a hand lever 41, conveniently extending in a more or less horizontal direction so as not to project markedly above the bed and be in the way during the normal operations of the machine. For positioning the rolls in desired position herein I have shown it provided with a hand latch 43 cooperating with a notched sector 45, the construction being of well known type common, for example, in the switch levers in railway switch towers. The sector 45 also provides a scale readily visible to the operator and a guide by which he may empirically adjust the position of the rolls for proper positioning of the particular article which he is about to wrap.

In the construction shown the lever 41 has a simple stroke through a path which does not return on itself for moving the rolls through their entire range of movement. One and only one position of the lever corresponds to each of the rolls. A movement in one direction always corresponds to a movement in the same sense and the movement from one extreme to another of a fixed path is analogous to the movement of the rolls themselves and makes the adjustment easily understood.

Having thus described in detail the particular form of my invention shown by way of example in the accompanying drawings, the principles exemplified by that illustrative embodiment, which principles I claim as new and desire to secure by Letters Patent, I shall express in the following claims.

Claims.

1. A wrapping machine for annular articles comprising a rotary shuttle, a pair of rolls for supporting an article in the eye of the shuttle having freedom of movement transversely of the plane of the shuttle, a lever pivoted between its ends, links connecting the ends thereof to the rolls and means for rocking the lever.

2. A wrapping machine for annular articles comprising a rotary shuttle, a pair of rolls for supporting an article in the eye of the shuttle having freedom of movement transversely of the plane of the shuttle, a rock shaft, crank arms extending in opposite directions therefrom, links connecting the ends of the arms to the rolls, a lever for rocking the shaft and a sector for positioning said last mentioned lever.

3. A wrapping machine for annular articles comprising an elevated bed, a standard thereon supporting a shuttle, said bed having slots transverse to the plane of the shuttle, roll-carrying members slidable in the slots, a rock shaft journalled beneath the bed, crank arms extending in opposite directions therefrom, links connecting the ends of said arms to said members and a lever at the side of the bed for rocking the shaft.

4. A wrapping machine for annular articles comprising an elevated bed, a standard thereon supporting a shuttle, said bed having slots transverse to the plane of the shuttle, roll-carrying members slidable in the slots, linkwork housed beneath said bed and having connection by the slots to said members and a handle at the side of the bed for shifting the linkwork.

5. A wrapping machine for annular articles comprising a rotary shuttle, a pair of rolls for supporting an article in the eye of the shuttle slidably mounted for movement transversely of the plane of the shuttle, means for shifting one of said rolls and linkwork operated thereby for determining a correlative movement of the other roll.

6. A wrapping machine for annular articles comprising a pair of rolls for supporting an article in the eye of the shuttle mounted for movement transversely of the plane thereof and means for moving the rolls in opposite directions comprising an operating handle having a single non-recurrent reciprocating stroke for moving said rolls through their entire range.

7. A wrapping machine for annular articles comprising a pair of rolls for supporting an article in the shuttle mounted for movement transversely of the plane thereof, means for moving the rolls in opposite directions comprising an operating handle having a single reciprocating stroke for moving the rolls throughout their entire range and positioning means co-operating with the handle and constituting a gage of positions of the rolls.

8. A wrapping machine for annular articles comprising a rotary shuttle, a pair of rolls for supporting an article in the eye of the shuttle movable transversely of the plane of the shuttle, linkwork between the rolls to enforce equal and opposite movements thereof and an operating handle connected to such linkwork.

9. A wrapping machine for annular articles comprising a rotary shuttle, a pair of rolls for supporting an article in the eye of the shuttle movable transversely of the plane of the shuttle, linkwork between the rolls to enforce equal and opposite movements thereof and a lever for operating the linkwork having releasable locking means to position the rolls in adjusted position.

10. A wrapping machine for annular articles comprising a rotary shuttle, a pair of rolls for supporting an article in the eye of the shuttle and mounted for sliding movement transversely of the plane of the shuttle and linkwork between the rolls to enforce simultaneous correlated movements thereof.

11. A wrapping machine for annular articles comprising a rotary shuttle, a pair of rolls for supporting an article in the eye of the shuttle and mounted for sliding movement transversely of the plane of the shuttle, linkwork between the rolls to enforce equal and opposite movements thereof and means for locking them in adjusted position.

12. A wrapping machine for annular articles comprising a rotary shuttle, a pair of rolls for supporting an article in the eye of the shuttle and mounted for sliding movement transversely of the plane of the shuttle, linkwork between the rolls to enforce simultaneous correlated movements thereof and an operating handle connected to such linkwork.

In testimony whereof, I have signed my name to this specification.

WILLIAM M. WHEILDON.